US010451036B2

(12) United States Patent
Herr et al.

(10) Patent No.: US 10,451,036 B2
(45) Date of Patent: Oct. 22, 2019

(54) ADJUSTMENT FACTOR FOR AERODYNAMIC PERFORMANCE MAP

(71) Applicant: General Electric Company, Schenectady, NY (US)

(72) Inventors: Stefan Herr, Greenville, SC (US); Murray Fisher, Greer, SC (US); Sara Simonne Delport, Rheine (DE); Jelmer Cnossen, Southampton (GB)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 15/587,670

(22) Filed: May 5, 2017

(65) Prior Publication Data
US 2018/0320660 A1   Nov. 8, 2018

(51) Int. Cl.
*G05D 17/00* (2006.01)
*F03D 7/02* (2006.01)
*F03D 7/04* (2006.01)

(52) U.S. Cl.
CPC ........... *F03D 7/0224* (2013.01); *F03D 7/028* (2013.01); *F03D 7/046* (2013.01); *F05B 2270/20* (2013.01); *F05B 2270/32* (2013.01); *F05B 2270/321* (2013.01); *F05B 2270/322* (2013.01); *G05B 2219/2619* (2013.01)

(58) Field of Classification Search
CPC .................................................. Y02E 10/723
USPC ........................................................ 700/287
See application file for complete search history.

(56) References Cited

U.S. PATENT DOCUMENTS

| 7,175,389 B2 | 2/2007 | Moroz |
| 7,281,891 B2 | 10/2007 | Smith et al. |
| 7,342,323 B2 | 3/2008 | Avagliano et al. |
| 7,346,462 B2 | 3/2008 | Delmerico |
| 7,505,833 B2 | 3/2009 | Delmerico et al. |
| 7,613,548 B2 | 11/2009 | Cardinal et al. |
| 7,822,560 B2 | 10/2010 | LeMieux |

(Continued)

FOREIGN PATENT DOCUMENTS

| EP | 2302206 A | 3/2011 |
| EP | 2 562 415 A1 | 2/2013 |

(Continued)

OTHER PUBLICATIONS

International Search Report and Written Opinion issued in connection with corresponding PCT Application No. PCT/US2018/030578 dated Sep. 5, 2018.

*Primary Examiner* — Suresh Suryawanshi
(74) *Attorney, Agent, or Firm* — Dority & Manning, P.A.

(57) ABSTRACT

The present disclosure is directed to a method for controlling a wind turbine using an adjusted aerodynamic performance map. In one embodiment, the method includes monitoring at least one of an actual wind parameter or operating data of the wind turbine using one or more sensors. Further, the method includes determining an adjustment factor for the aerodynamic performance map based, at least in part, on either or both of the measured actual wind parameter or the wind turbine operating data. Moreover, the method includes applying the adjustment factor to a first aerodynamic performance map to obtain an adjusted aerodynamic performance map. Thus, the method also includes controlling the wind turbine based on the adjusted aerodynamic performance map.

17 Claims, 7 Drawing Sheets

(56) References Cited

U.S. PATENT DOCUMENTS

| | | |
|---|---|---|
| 7,861,583 B2 | 1/2011 | Honhoff et al. |
| 7,942,629 B2 | 5/2011 | Shi et al. |
| 7,979,167 B2 | 7/2011 | Delmerico et al. |
| 8,025,476 B2 | 9/2011 | Zheng et al. |
| 8,050,887 B2 | 11/2011 | Ahmann |
| 8,257,040 B2 | 9/2012 | Chen et al. |
| 8,508,162 B2 * | 8/2013 | Choi ............. H02P 21/16 318/400.02 |
| 8,917,383 B2 * | 12/2014 | Fuglsang ......... F03D 7/0224 356/28 |
| 9,217,416 B2 | 12/2015 | Spruce et al. |
| 9,605,558 B2 | 3/2017 | Perley et al. |
| 9,777,708 B2 * | 10/2017 | Risager ........... F03D 7/0224 |
| 2007/0075546 A1 | 4/2007 | Avagliano et al. |
| 2007/0126292 A1 * | 6/2007 | Lugg ............... F01D 5/03 310/11 |
| 2008/0086281 A1 | 4/2008 | Santos |
| 2009/0047116 A1 | 2/2009 | Barbu et al. |
| 2011/0140431 A1 | 6/2011 | Landa et al. |
| 2012/0128488 A1 | 5/2012 | Kristoffersen |
| 2012/0139244 A1 * | 6/2012 | Bonnet ............. F03D 7/02 290/44 |
| 2012/0263601 A1 | 10/2012 | Baker et al. |
| 2013/0033040 A1 | 2/2013 | Bowyer et al. |
| 2013/0156577 A1 | 6/2013 | Esbensen et al. |
| 2013/0204447 A1 | 8/2013 | Bjerge et al. |
| 2013/0297085 A1 | 11/2013 | Xiongzhe et al. |
| 2014/0035285 A1 | 2/2014 | Creaby et al. |
| 2014/0037447 A1 | 2/2014 | Attia |
| 2014/0199156 A1 | 7/2014 | Pineda Arno |
| 2015/0056072 A1 * | 2/2015 | Perley .............. F03D 7/0288 416/1 |
| 2015/0233348 A1 * | 8/2015 | Hiremath ............ F03D 7/02 416/1 |
| 2015/0292483 A1 * | 10/2015 | Slack ............... F03D 7/0276 290/44 |
| 2016/0138571 A1 * | 5/2016 | Perley .............. F03D 1/06 702/43 |
| 2016/0237988 A1 * | 8/2016 | Perley .............. F03D 7/0288 |
| 2016/0312767 A1 * | 10/2016 | Wilson ............. F03D 9/25 |
| 2017/0129989 A1 | 5/2017 | Kristoffersen et al. |

FOREIGN PATENT DOCUMENTS

| | | |
|---|---|---|
| WO | WO2013/083130 A1 | 6/2013 |
| WO | 2015/085465 A1 | 6/2015 |
| WO | WO2016/078669 A1 | 5/2016 |

* cited by examiner

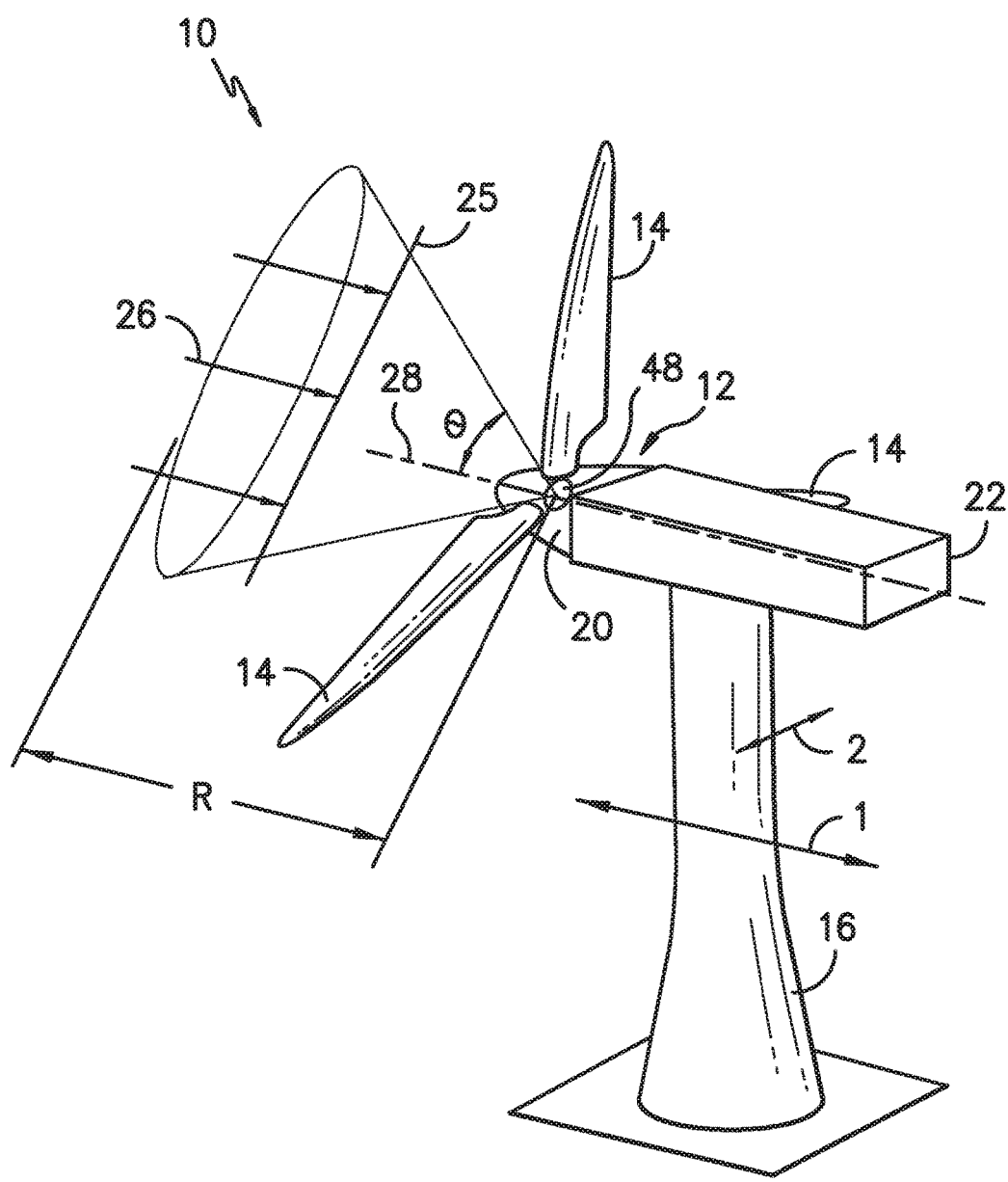
FIG. -1-

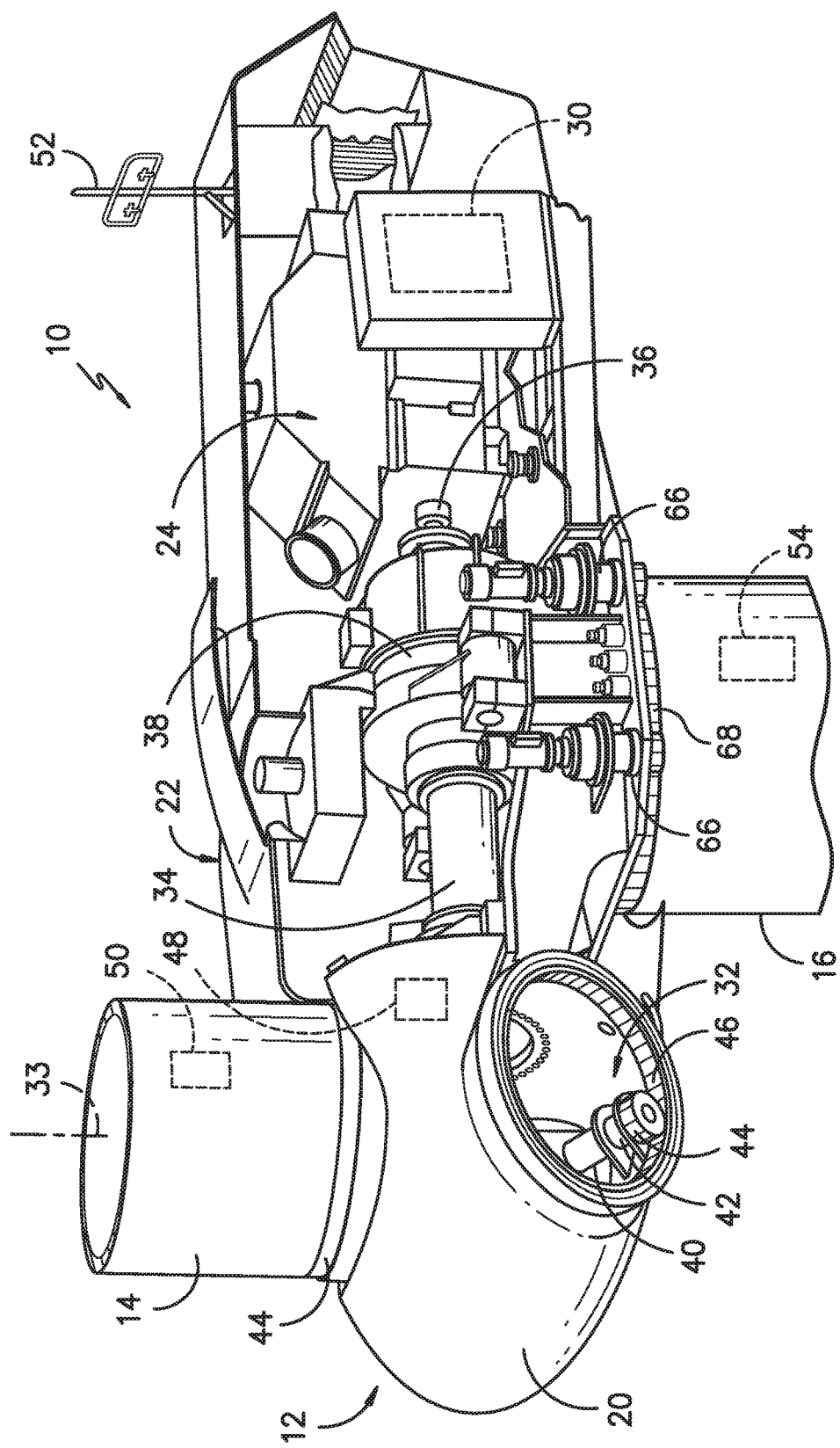
FIG. -2-

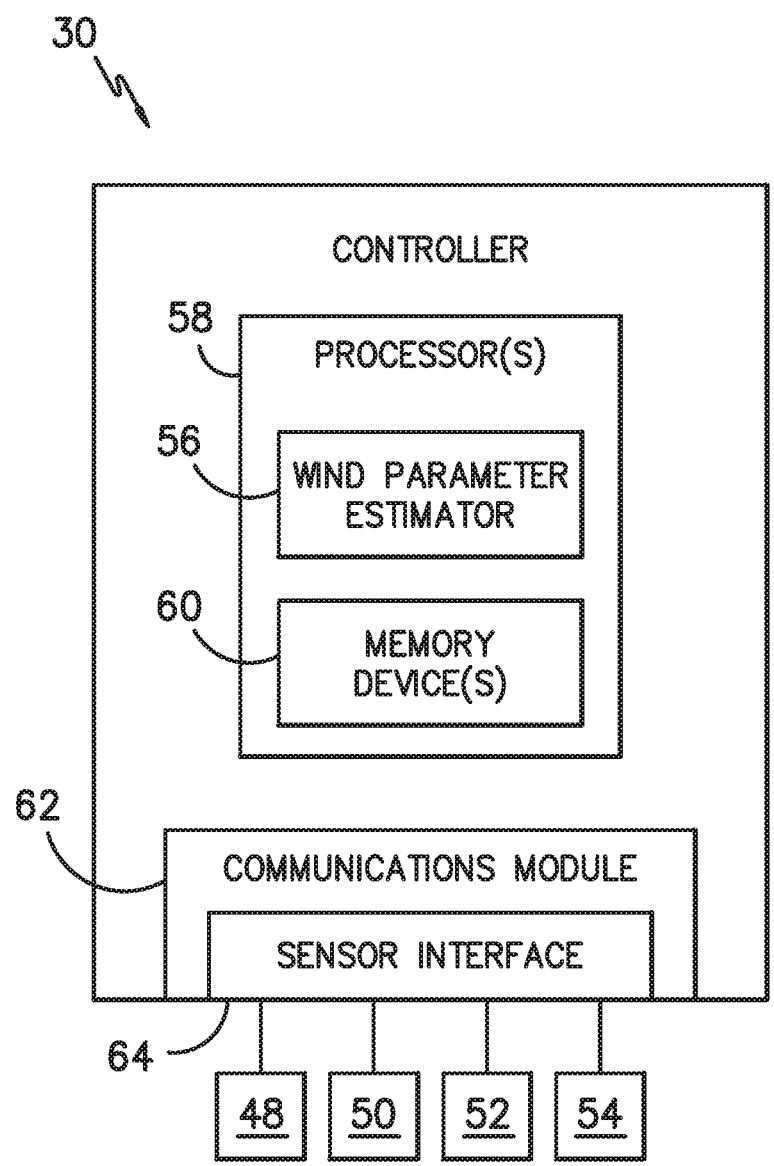
FIG. -3-

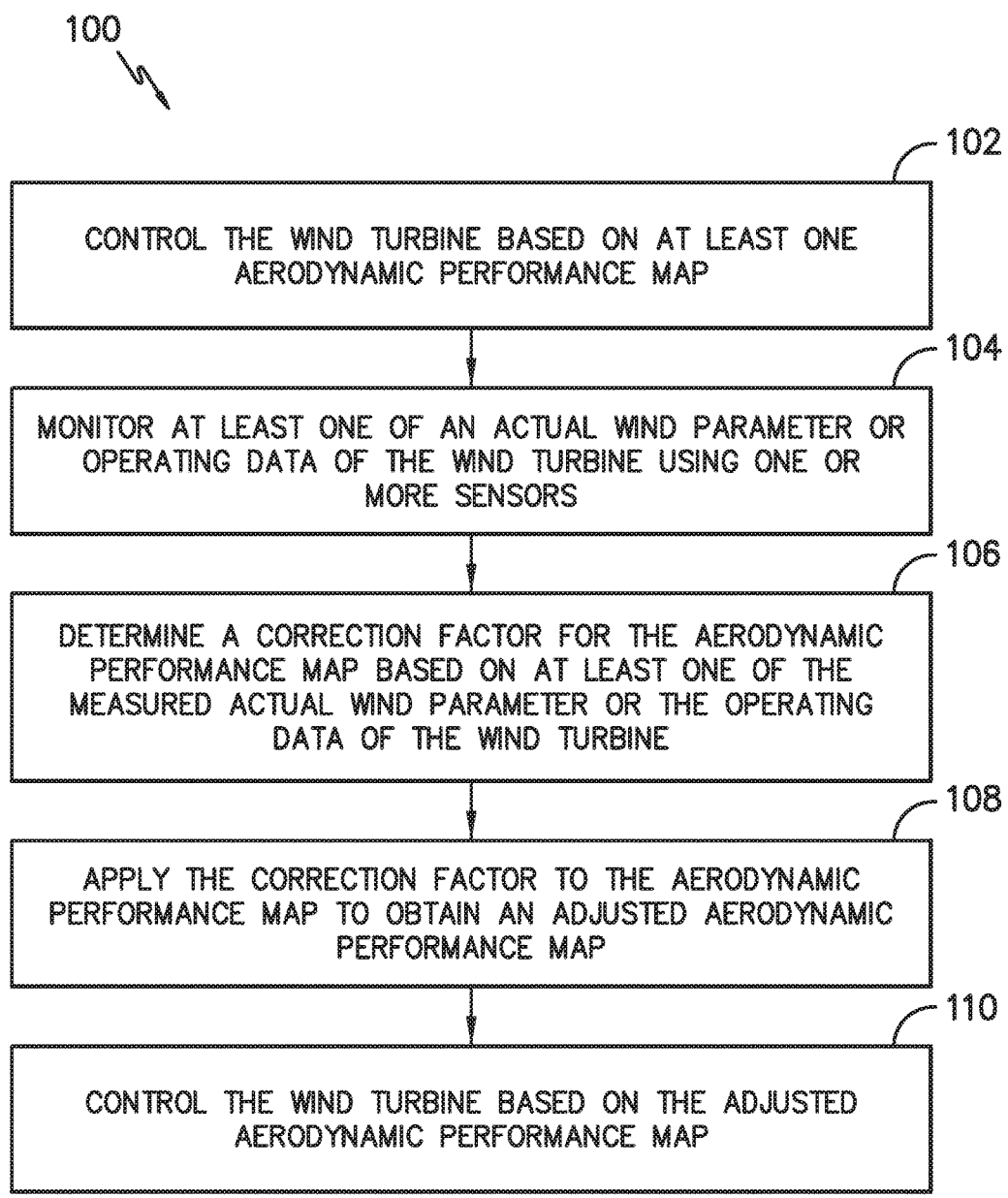
FIG. -4-

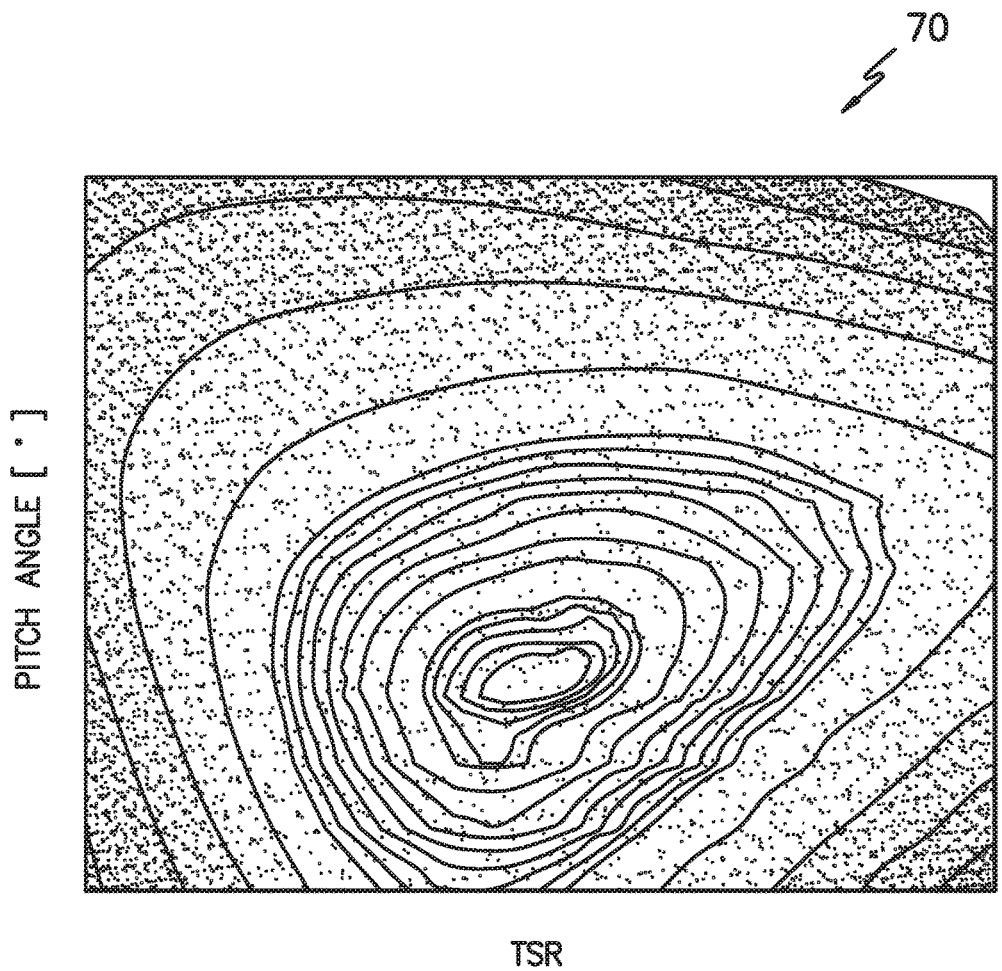
FIG. -5-

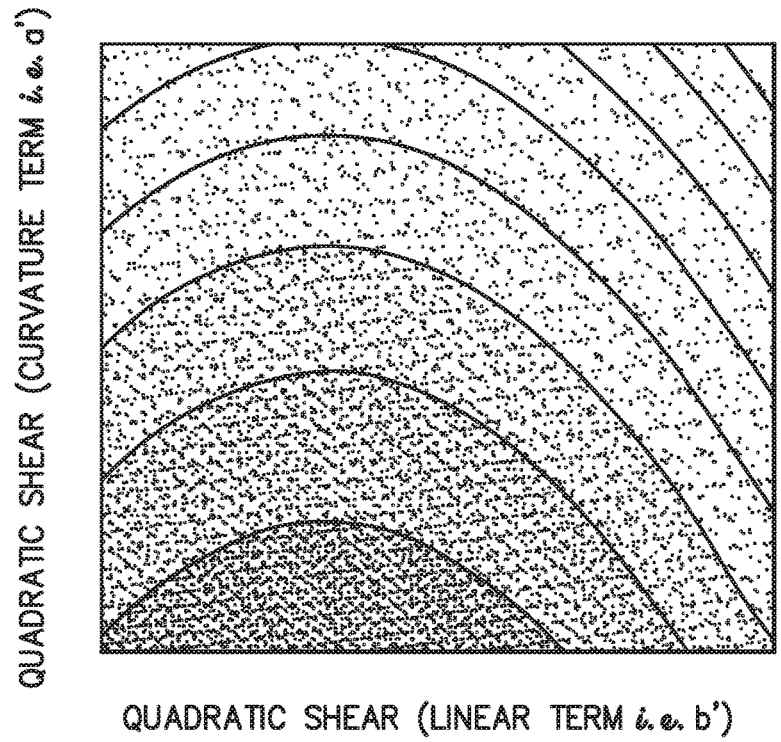
FIG. -6-
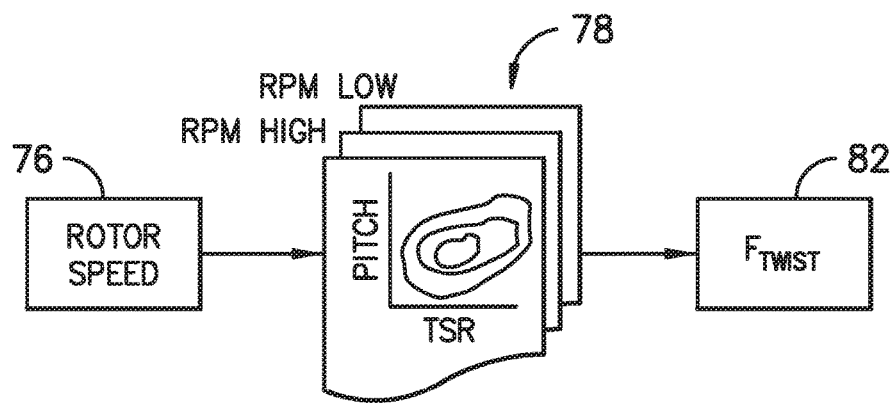
FIG. -7-

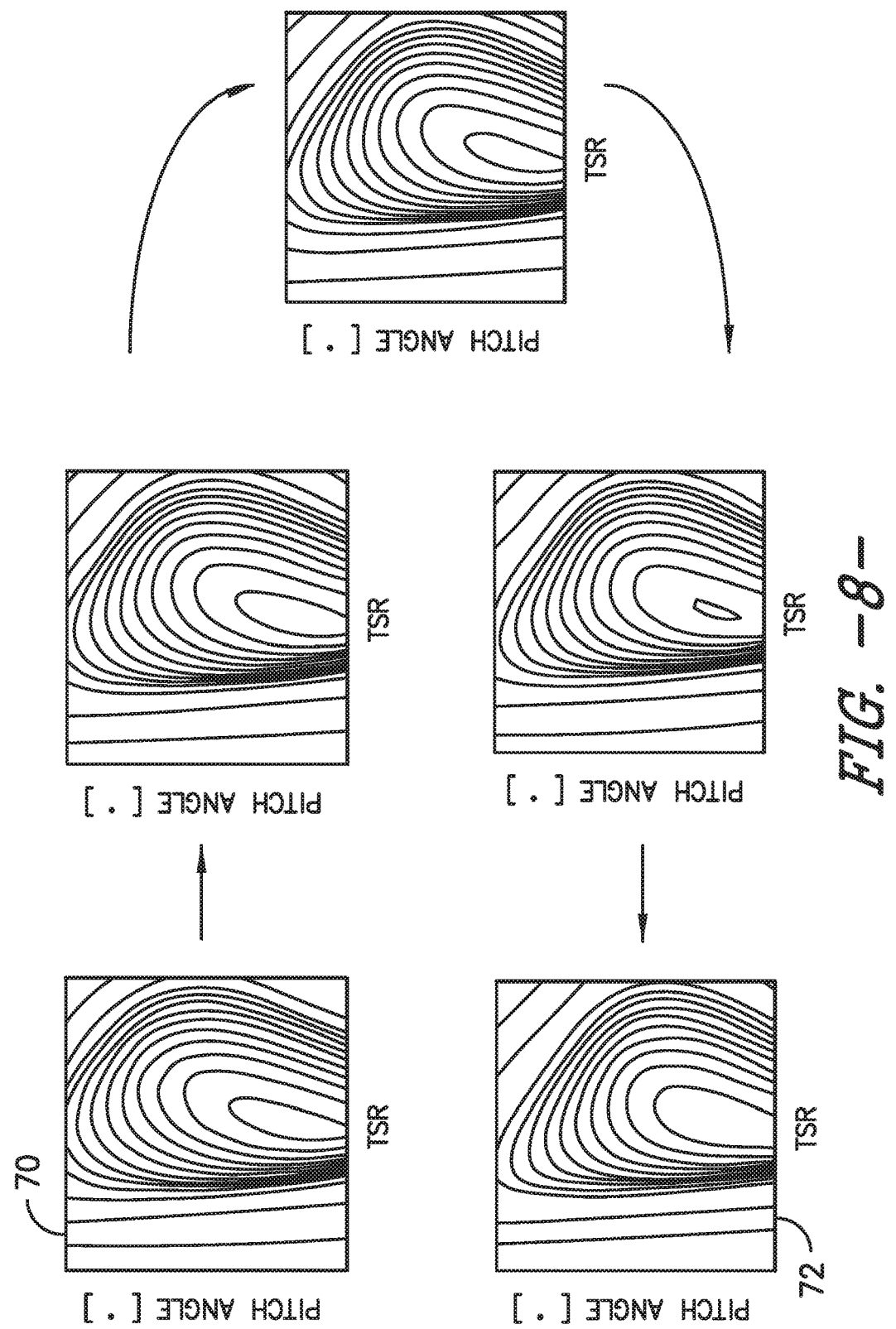
FIG. -8-

ADJUSTMENT FACTOR FOR AERODYNAMIC PERFORMANCE MAP

FIELD OF THE INVENTION

The present invention relates generally to wind turbines, and more particularly, to adjustment factors for aerodynamic performance maps used in wind turbine controllers that account for wind shear, turbulence intensity, and/or blade aerodynamic shape.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Changes in atmospheric conditions, for example, wind speed, wind turbulence, wind gusts, wind direction, and density may significantly influence power produced by the generator. A power output of the generator increases with wind speed until the wind speed reaches a rated wind speed for the turbine. At and above the rated wind speed, the generator operates at a rated power. The rated power is an output power at which the generator can operate with a level of fatigue or extreme load to turbine components that is predetermined to be acceptable. At wind speeds higher than a certain speed, typically referred to as a trip limit, the wind turbine may implement a control action, such as shutting down or de-rating the wind turbine in order to protect wind turbine components from damage. In addition, there may be certain wind speeds and/or operational set points (such as generator speed or power) that lead to a corrective action (such as a pitch control action) below rated power.

In certain control systems, such as the system described in U.S. Pat. No. 9,605,558 filed on Aug. 20, 2013 entitled "System and Method for Preventing Excessive Loading on a Wind Turbine" which is incorporated herein by reference in its entirety, a wind condition is estimated using wind turbine operating data, a series of equations, and one or more aerodynamic performance maps. The aerodynamic performance map(s) are dimensional or non-dimensional tables or graphs that describe rotor loading and performance (e.g. power, thrust, torque, bending moment, or similar) under given conditions (e.g. density, wind speed, rotor speed, pitch angles, or similar). As such, the aerodynamic performance map(s) may include: power coefficient, thrust coefficient, torque coefficient, and/or partial derivatives with respect to pitch angle, rotor speed, or tip speed ratio. Alternatively, the aerodynamic performance maps can be dimensional power, thrust, and/or torque values instead of coefficients. Once the desired coefficients are known, the controller can control the wind turbine based thereon.

The aerodynamic performance map(s) mentioned above are static and are typically determined during a design stage of the wind turbine. Therefore, the aerodynamic performance map(s) are not dependent upon changing wind conditions that may be present during operation of the wind turbine, such as wind speed, turbulence intensity, wind shear, or sudden wind gusts.

Accordingly, a system and method for controlling a wind turbine that included adjustment factors for the aerodynamic performance maps to account for wind shear, turbulence intensity, and/or blade aerodynamic shape would be desired in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for controlling a wind turbine. The method includes controlling the wind turbine based on at least one first aerodynamic performance map. The method also includes monitoring an actual wind parameter of the wind turbine using one or more sensors. Further, the method includes determining an adjustment factor for the first aerodynamic performance map based at least in part on the measured actual wind parameter. Moreover, the method includes applying the adjustment factor to the first aerodynamic performance map to obtain an adjusted aerodynamic performance map. Thus, the method also includes controlling the wind turbine based on the adjusted aerodynamic performance map.

In one embodiment, the actual wind parameter includes a wind gust, a wind speed, a wind direction, a wind acceleration, a wind turbulence, a wind shear, a wind veer, a wake interference, or any other wind parameter. Thus, in one embodiment, the method may further include determining the adjustment factor for the first aerodynamic performance map based at least in part on the wind shear so as to account for variations in wind speeds near the wind turbine.

In another embodiment, the step of determining the adjustment factor for the first aerodynamic performance map may include utilizing one or more look-up tables, one or more equations, or a simulation model.

In further embodiments, the step of applying the adjustment factor to the first aerodynamic performance map to obtain the adjusted aerodynamic performance map may include multiplying the adjustment factor to at least one of a power coefficient or thrust coefficient obtained from the first aerodynamic performance map.

In several embodiments, the method may include providing operating data indicative of current wind turbine operation to the processor. In such embodiments, the operating data may include, for example, rotor speed, generator speed, pitch angle, power output, drivetrain torque, air density, ambient temperature, and/or atmospheric pressure. Thus, in one embodiment, the method may further include determining the adjustment factor for the first aerodynamic performance map based at least in part on the rotor speed so as to account for at least one of twist or deflection of one or more rotor blades of the wind turbine.

In additional embodiments, the step of determining the adjustment factor for the first aerodynamic performance map based at least in part on the rotor speed may include inputting the rotor speed into the processor containing a plurality of aerodynamic performance maps corresponding to a plurality of rotor speeds, selecting one of the plurality of aerodynamic performance maps that corresponds to the rotor speed, and extracting the adjustment factor from the selected aerodynamic performance map.

In particular embodiments, the step of controlling the wind turbine based on the adjusted aerodynamic performance map may include implementing a control action. Such control actions may include, for example, altering the pitch angle of a rotor blade, modifying a generator torque, modifying the generator speed, modifying the power output, yawing a nacelle of the wind turbine, braking one or more wind turbine components, activating an airflow modifying element on a rotor blade, or any other suitable control action or combinations thereof.

In another aspect, the present disclosure is directed to a method for adjusting an aerodynamic performance map used by a wind turbine controller during wind turbine operation. The method includes monitoring at least one of an actual wind parameter of the wind turbine or an operating parameter of the wind turbine using one or more sensors. Further, the method includes determining an adjustment factor for the aerodynamic performance map based at least in part on the operating data. Moreover, the method includes applying the adjustment factor to the aerodynamic performance map to obtain an adjusted aerodynamic performance map.

In yet another aspect, the present disclosure is directed to a system for controlling a wind turbine. The system includes one or more sensors configured to monitor operating data indicative of current wind turbine operation and a wind turbine controller having at least one processor communicatively coupled to the one or more sensors. The processor is configured to perform one or more operations, including but not limited to controlling the wind turbine based on at least one first aerodynamic performance map, determining an adjustment factor for the first aerodynamic performance map based at least in part on the operating data, applying the adjustment factor to the first aerodynamic performance map to obtain an adjusted aerodynamic performance map, and controlling the wind turbine based on the adjusted aerodynamic performance map. It should be understood that the system may further include any of the additional features and/or steps as described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a simplified, internal view of one embodiment of a nacelle of a wind turbine according to the present disclosure;

FIG. 3 illustrates a block diagram of one embodiment of suitable components that may be included in a controller of a wind turbine according to the present disclosure;

FIG. 4 illustrates a flow diagram of one embodiment of a method for controlling a wind turbine based on an adjusted aerodynamic performance map according to the present disclosure;

FIG. 5 illustrates a schematic diagram of one embodiment of an aerodynamic performance map according to the present disclosure;

FIG. 6 illustrates one embodiment of a graph of the quadratic wind shear for a first turbine measured parameter a' versus the quadratic wind shear for a first turbine measured parameter b' according to the present disclosure;

FIG. 7 illustrates a schematic diagram of one embodiment of a rotor speed input being used to determine a adjustment factor for a first aerodynamic performance map according to the present disclosure; and FIG. 8 illustrates a schematic diagram of one embodiment of a how a first aerodynamic performance map changes with increasing rotor speed according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to an adjustment factor for an aerodynamic performance map used in wind turbine control systems and methods of determining same. Aerodynamic performance maps are generally static shapes for uniform inflow conditions. However, in actual wind turbine operation, rotor blade shape and inflow wind conditions are known to vary from the original design conditions that assume idealized conditions. To account for such variations, the present disclosure includes an adjustment factor that can be used to modify the utilization of the aerodynamic performance map(s) within the wind turbine control system. More specifically, the adjustment factors described herein are configured to account for wind shear (or atmospheric boundary layer profile shapes), turbulence intensity, and/or blade aeroelastic shape (e.g. deflection and twist).

Referring now to the drawings, FIG. 1 illustrates a wind turbine 10 in accordance with aspects of the present disclosure. As shown, the wind turbine 10 comprises a rotor 12 having a plurality of rotor blades 14 mounted on a hub 20. The wind turbine 10 also comprises a nacelle 22 that is mounted atop a tower 16. The rotor 12 is operatively coupled to an electrical generator 24 (FIG. 2) housed within the nacelle 22. The tower 16 exposes the rotor blades 14 to the wind (directionally represented by arrow 26), which causes the rotor blades 14 to rotate about an axis 28. As such, the rotor blades 14 transform the kinetic energy of the wind into a rotational torque, which is further transformed into electrical energy via the electrical generator 24.

Referring now to FIG. 2, a simplified, internal view of one embodiment of the nacelle 22 of the wind turbine 10 shown in FIG. 1 is illustrated. As shown, the generator 24 may be disposed within the nacelle 22. In general, the generator 24 may be coupled to the rotor 12 for producing electrical power from the rotational energy generated by the rotor 12. For example, as shown in the illustrated embodiment, the rotor 12 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 14 and the hub 20. The gearbox 38 may then be configured to convert the low speed, high torque input to a high speed, low torque output to drive the generator shaft 36 and, thus, the generator 24.

The wind turbine 10 may also include a controller 30 centralized within the nacelle 22. Alternatively, the controller 30 may be located within any other component of the wind turbine 10 or at a location outside the wind turbine 10. Further, the controller 30 may be communicatively coupled to any number of the components of the wind turbine 10 in order to control the operation of such components and/or implement various correction actions as described herein. As such, the controller 30 may include a computer or other suitable processing unit. Thus, in several embodiments, the controller 30 may include suitable computer-readable instructions that, when implemented, configure the controller 30 to perform various different functions, such as receiving, transmitting and/or executing wind turbine control signals. Accordingly, the controller 30 may generally be configured to control the various operating modes (e.g., start-up or shut-down sequences), de-rate the wind turbine, and/or control various components of the wind turbine 10 as will be discussed in more detail below.

Still referring to FIG. 2, each rotor blade 14 may also include a pitch adjustment mechanism 32 configured to rotate each rotor blade 14 about its pitch axis 33. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 14 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 14 about the pitch axis 33. Similarly, the wind turbine 10 may include one or more yaw drive mechanisms 66 communicatively coupled to the controller 30, with each yaw drive mechanism(s) 66 being configured to change the angle of the nacelle 22 relative to the wind (e.g., by engaging a yaw bearing 68 of the wind turbine 10).

Referring generally to FIGS. 1-3, the wind turbine 10 may include one or more sensors 48, 50, 52, 54 for measuring various wind parameters of the wind turbine 10. For example, as shown in FIG. 1, sensor 48 is located on the hub 20 so as to measure an actual wind parameter upwind from the wind turbine 10. The actual wind parameter may be any of the following: a wind gust, a wind speed, a wind direction, a wind acceleration, a wind turbulence, a wind shear, a wind veer, a wake interference, or similar. Further, the sensor(s) 48, 50, 52, 54 may include at least one LIDAR sensor for measuring upwind parameters. For example, as shown in FIG. 1, LIDAR sensor 48 is a measurement radar configured to scan an annular region around the wind turbine 10 and measure wind speed based upon reflection and/or scattering of light transmitted by the LIDAR sensor from aerosol. The cone angle (θ) and the range (R) of the LIDAR sensor 48 may be suitably selected to provide a desired accuracy of measurement as well as an acceptable sensitivity.

In the illustrated embodiment, the sensor(s) 48, 50, 52, 54 is located on the hub 20 whereupon the rotor blades 14 are mounted. In further embodiments, the sensor(s) 48, 50, 52, 54 may also be located near the base of the wind turbine tower 16, on one or more of the rotor blades 14, on the nacelle 22, on a meteorological mast of the wind turbine 10, or at any other suitable location. In still further embodiments, the sensor(s) 48, 50, 52, 54 may be located in any suitable location on or near the wind turbine 10. Further, the sensor(s) 48, 50, 52, 54 may be configured to measure a wind parameter ahead of at least one specific portion, typically the most significant sections of the rotor blades 14 in terms of contributions of those sections to aerodynamic torque on the rotor blades 14, e.g. sections close to the tips of the rotor blades 14. The points ahead of the rotor blades 14 at which wind speed is measured by the sensor(s) 48, 50, 52, 54 is represented by plane 25 as shown in FIG. 1.

In alternative embodiments, the sensor(s) 48, 50, 52, 54 may be any other suitable sensors capable of measuring wind parameters upwind of the wind turbine 10. For example, the sensor(s) 48, 50, 52, 54 may be accelerometers, pressure sensors, angle of attack sensors, vibration sensors, MIMU sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein, the term "monitor" and variations thereof indicates that the various sensors of the wind turbine may be configured to provide a direct measurement of the parameters being monitored or an indirect measurement of such parameters. Thus, the sensor(s) 48, 50, 52, 54 may, for example, be used to generate signals relating to the parameter being monitored, which can then be utilized by the controller 30 to determine the actual condition.

Referring specifically to FIG. 3, there is illustrated a block diagram of one embodiment of the controller 30 according to the present disclosure. As shown, the controller 30 may include one or more processor(s) 58, a wind turbine condition estimator 56, and associated memory device(s) 60 configured to perform a variety of computer-implemented functions (e.g., performing the methods, steps, calculations and the like and storing relevant data as disclosed herein). Additionally, the controller 30 may also include a communications module 62 to facilitate communications between the controller 30 and the various components of the wind turbine 10. Further, the communications module 62 may include a sensor interface 64 (e.g., one or more analog-to-digital converters) to permit signals transmitted from the sensor(s) 48, 50, 52, 54 to be converted into signals that can be understood and processed by the processors 58. It should be appreciated that the sensor(s) 48, 50, 52, 54 may be communicatively coupled to the communications module 62 using any suitable means. For example, as shown in FIG. 3, the sensor(s) 48, 50, 52, 54 are coupled to the sensor interface 64 via a wired connection. However, in other embodiments, the sensor(s) 48, 50, 52, 54 may be coupled to the sensor interface 64 via a wireless connection, such as by using any suitable wireless communications protocol known in the art. As such, the processor 58 may be configured to receive one or more signals from the sensor(s) 48, 50, 52, 54.

The wind turbine condition estimator 56 may be considered software that utilizes operating data to calculate, in real-time, various wind turbine conditions. Further, the wind turbine condition estimator 56 may comprise firmware that includes the software, which may be executed by the processor(s) 58. Further, the wind turbine condition estimator 56 may be in communication the various sensor(s) 48, 50, 52, 54 and devices of the wind turbine 10, which may provide the operating data to the wind turbine condition estimator 56.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 30 to perform various functions including, but not limited to, estimating one or more wind conditions of the wind turbine 10 based on the operating data, transmitting suitable control signals to implement control actions in response to the detection of transient wind conditions, and/or various other suitable computer-implemented functions.

Referring now to FIG. 4, a flow diagram of a method 100 for controlling the wind turbine 10 according to the present disclosure is illustrated. For example, as shown at 102, the method 100 includes controlling the wind turbine 10 based on at least one first aerodynamic performance map. The aerodynamic performance map(s) described herein generally refer to dimensional or non-dimensional tables or graphs that describe rotor loading and performance (e.g. power, thrust, torque, or bending moment, or similar) under given conditions (e.g. density, wind speed, rotor speed, pitch angles, or similar). As such, the aerodynamic performance map(s) may include: power coefficient, thrust coefficient, torque coefficient, and/or partial derivatives with respect to pitch angle, rotor speed, or tip speed ratio (TSR). Alternatively, the aerodynamic performance map(s) can be dimensional power, thrust, and/or torque values instead of coefficients. Referring particularly to FIG. 5, one embodiment of an aerodynamic performance map 70 is illustrated. For example, as shown, the aerodynamic performance map 70 is a graph of pitch angle versus TSR that provides a corresponding power coefficient $C_p$.

Referring back to FIG. 4, as shown at 104, the method 100 includes monitoring an actual wind parameter or operating data of the wind turbine 10 using one or more of the sensor(s) 48, 50, 52, 54. More specifically, as mentioned, the wind parameters may include a wind gust, a wind speed, a wind direction, a wind acceleration, a wind turbulence, a wind shear, a wind veer, a wake interference, or similar. Further, in one embodiment, the operating data may include, for example, rotor speed, generator speed, pitch angle, power output, drivetrain torque, air density, ambient temperature, and/or atmospheric pressure, tip speed ratio, or other similar operating condition of the wind turbine 10.

As shown at 106, the method 100 includes determining, e.g. via the processor(s) 58, an adjustment factor for the first aerodynamic performance map 70 based, at least in part, on the measured actual wind parameter and/or the operating data. For example, in one embodiment, the processor(s) 58 may be configured to utilize one or more look-up tables, one or more equations, or a simulation model to determine the adjustment factors described herein. More specifically, as shown in FIG. 6, where the measured actual wind parameter corresponds to the wind shear, the processor(s) 58 is configured to determine the adjustment factor for the first aerodynamic performance map 70 based, at least in part, on the wind shear so as to account for variations in wind speeds near the wind turbine 10. For example, as shown, FIG. 6 illustrates a wind shear estimator graph 74 of quadratic wind shear for a first turbine measured parameter (i.e. curvature term a') versus quadratic wind shear for a second turbine measured parameter (i.e. linear term b'). More specifically, one possibility for describing the wind speed profile with increasing altitude is a quadratic formula (e.g. $ax^2+bx+c=0$) with two parameters (a' and b'). The wind speed is zero at the ground (i.e. at zero altitude) and two parameters are sufficient as the third parameter in the polynomial is equal to $0=ax^2+bx+0$. With the knowledge of the wind speed profile, the processor(s) 58 can compare the power in the wind over the rotor swept area and compare this value to the power for a wind speed that is constant at the average of the given wind speed profile. Thus, the adjustment factor, $F_{SHEAR}$ (e.g. which ranges from 0.8 to 1.4 on the illustrated graph), can be read directly from the graph 74.

In another embodiment, the processor(s) 58 is configured to determine the adjustment factor for the aerodynamic performance map 70 based, at least in part, on the rotor speed of the wind turbine 10 so as to account for twist and/or deflection of one or more of the rotor blades 14 of the wind turbine 10. For example, as shown in FIG. 7, the processor (s) 58 may be configured to receive the rotor speed 76 as an input and optionally store the rotor speed 76 in the memory device(s) 60. More specifically, in such embodiments, the memory device(s) 60 may include a multi-dimensional table having 78 a plurality of aerodynamic performance maps 78 corresponding to a plurality of different rotor speeds 80 stored therein. In other words, for each possible rotor speed there is a separate chart of the adjustment factor, which uses pitch and TSR as values. Thus, as shown, the processor(s) 58 is configured to select one of the aerodynamic performance maps from the plurality of aerodynamic performance maps 78 that corresponds to the input rotor speed 76. In addition, the processor(s) 58 is configured to interpolate between adjacent fixed rotor speed charts. Accordingly, the processor (s) 58 can then determine a current pitch angle and TSR and extract the adjustment factor, i.e. $F_{TWIST}$ 82, from the selected aerodynamic performance map. In alternative embodiments, the adjustment factor may be determined based on a single dimensional table as well as one or more equations.

As shown at 108, the method 100 includes applying the adjustment factor to the aerodynamic performance map 70 to obtain an adjusted aerodynamic performance map 72. For example, as shown in illustrated embodiment of FIG. 8, as the rotor speed increases, the aerodynamic performance map(s) change. In further embodiments, the step of applying the adjustment factor to the first aerodynamic performance map 70 to obtain the adjusted aerodynamic performance map may include multiplying the adjustment factor by at least one of a power coefficient or thrust coefficient obtained from the aerodynamic performance map.

For example, where the adjustment factor is based on wind shear as explained in reference to FIG. 6, the adjustment factor, $F_{SHEAR}$ can be used to adjust the first aerodynamic performance map, e.g. via Equations (1) and (2) below:

$$C_p = Cp_{ESTIMATOR} * F_{SHEAR\_POWER} \quad \text{Equation (1)}$$

$$C_t = Ct_{ESTIMATOR} * F_{SHEAR\_THRUST} \quad \text{Equation (2)}$$

Where $C_p$ is the adjusted power coefficient,
$C_t$ is the adjusted thrust coefficient,
$Cp_{ESTIMATOR}$ is the power coefficient from the first aerodynamic performance map,
$Ct_{ESTIMATOR}$ is the thrust coefficient from the first aerodynamic performance map,
$F_{SHEAR\_POWER}$ is the adjustment factor for the power coefficient, and
$F_{SHEAR\_THRUST}$ is the adjustment factor for the thrust coefficient.

Alternatively, where the adjustment factor is based on rotor speed as explained in reference to FIG. 7, the adjustment factor, $F_{TWIST}$ can be used to adjust the first aerodynamic performance map, e.g. via Equations (3) and (4) below:

$$C_p = Cp_{ESTIMATOR} * F_{TWIST\_POWER} \quad \text{Equation (3)}$$

$$C_t = Ct_{ESTIMATOR} * F_{TWIST\_THRUST} \quad \text{Equation (4)}$$

Where $C_p$ is the adjusted power coefficient,
$C_t$ is the adjusted thrust coefficient,
$Cp_{ESTIMATOR}$ is the power coefficient from the first aerodynamic performance map,
$Ct_{ESTIMATOR}$ is the thrust coefficient from the first aerodynamic performance map,
$F_{TWIST\_POWER}$ is the adjustment factor for the power coefficient, and
$F_{TWIST\_THRUST}$ is the adjustment factor for the thrust coefficient.

In still additional embodiments, the shear adjustment factor $F_{SHEAR}$ and the twist adjustment factor $F_{TWIST}$ may both be used to adjust the first aerodynamic performance maps, e.g. using Equations (5) and (6) below:

$$C_p = Cp_{ESTIMATOR} * F_{SHEAR\_POWER} * F_{TWIST\_POWER} \quad \text{Equation (5)}$$

$$C_t = Ct_{ESTIMATOR} * F_{SHEAR\_THRUST} * F_{TWIST\_THRUST} \quad \text{Equation (6)}$$

Where $C_p$ is the adjusted power coefficient,
$C_t$ is the adjusted thrust coefficient,
$Cp_{ESTIMATOR}$ is the power coefficient from the first aerodynamic performance map,
$Ct_{ESTIMATOR}$ is the thrust coefficient from the first aerodynamic performance map,
$F_{TWIST\_POWER}$ is the adjustment factor for the power coefficient relating to twist,
$F_{TWIST\_THRUST}$ is the adjustment factor for the thrust coefficient relating to twist,
$F_{SHEAR\_POWER}$ is the adjustment factor for the power coefficient relating to shear, and
$F_{SHEAR\_THRUST}$ is the adjustment factor for the thrust coefficient relating to shear.

Referring back to FIG. 4, as shown at 110, the method 100 includes controlling the wind turbine 10 based on the adjusted aerodynamic performance map(s). For example, in one embodiment, the wind turbine condition estimator 56 may implement a control algorithm having a series of equations to determine an estimated wind turbine condition as a function of the pitch angle, the generator speed, the power output, and the air density. Further, the equations may be solved using the operating data and the updated aerodynamic performance maps. Such control methodology provides accurate wind turbine control that maximizes power output and reduces excessive wind turbine loading. In alternative embodiments, the method 100 can also be used to increase performance. In such embodiments, the loads may increase.

In particular embodiments, the step of controlling the wind turbine based on the adjusted aerodynamic performance map may include implementing a control action. The control action(s) as described herein may be any suitable control action so as to reduce loads acting on the wind turbine 10. For example, in several embodiments, the control action may include temporarily de-rating or up-rating the wind turbine to permit the loads acting on one or more of the wind turbine components to be reduced or otherwise controlled. Up-rating the wind turbine, such as by up-rating torque, may temporarily slow down the wind turbine and act as a brake to help reduce loads. De-rating the wind turbine may include speed de-rating, torque de-rating or a combination of both. Further, the wind turbine may be de-rated by reducing speed and increasing torque, which can be beneficial so as to maintain power. In another embodiment, the wind turbine 10 may be de-rated by pitching one or more of the rotor blades 14 about its pitch axis 33. More specifically, the controller 30 may generally control each pitch adjustment mechanism 32 in order to alter the pitch angle of each rotor blade 14 between −10 degrees (i.e., a power position of the rotor blade 14) and 90 degrees (i.e., a feathered position of the rotor blade 14). In still another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 30 by transmitting a suitable control signal/command to the generator 24 in order to modulate the magnetic flux produced within the generator 24.

The wind turbine 10 may also be temporarily de-rated by yawing the nacelle 22 to change the angle of the nacelle 22 relative to the direction of the wind. In other embodiments, the controller 30 may be configured to actuate one or more mechanical brake(s) or activate an airflow modifying element on a rotor blade in order to reduce the rotational speed and/or load of the rotor blades 14, thereby reducing component loading. In still further embodiments, the controller 30 may be configured to perform any appropriate control action known in the art. Further, the controller 30 may implement a combination of two or more control actions.

It should also be appreciated that an advantage of the present invention is that the system and method may be implemented using existing components of the wind turbine 10. As such, a user is not required to purchase, install, and maintain new equipment. Further, the controller 30 may be integrated with a broader control system, such as, but not limiting of, a wind turbine control system, a plant control system, a remote monitoring system, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine, the method comprising:
controlling, via a processor, the wind turbine based on at least one first aerodynamic performance map, the at least one first aerodynamic performance map comprising a dimensional or a non-dimensional table or graph that relates a loading of a rotor of the wind turbine and performance under one or more given conditions, the one or more given conditions comprising at least one of density, wind speed, rotor speed, or pitch angle;
monitoring an actual wind parameter of the wind turbine using one or more sensors;
determining, via the processor, an adjustment factor for the at least one first aerodynamic performance map based at least in part on the measured actual wind parameter;
multiplying the adjustment factor by at least one of a power coefficient or thrust coefficient obtained from the at least one first aerodynamic performance map to obtain an adjusted aerodynamic performance map; and,
controlling the wind turbine based on the adjusted aerodynamic performance map.

2. The method of claim 1, wherein the actual wind parameter comprises at least one of a wind gust, a wind speed, a wind direction, a wind acceleration, a wind turbulence, a wind shear, a wind veer, or a wake interference.

3. The method of claim 1, wherein determining the adjustment factor for the at least one first aerodynamic performance map further comprises utilizing one or more look-up tables, one or more equations, or a simulation model.

4. The method of claim 2, further comprising determining the adjustment factor for the at least one first aerodynamic performance map based at least in part on the wind shear so as to account for variations in wind speeds near the wind turbine.

5. The method of claim 1, further comprising providing operating data indicative of current wind turbine operation to the processor.

6. The method of claim 5, wherein the operating data comprises any one of or combination of the following: rotor speed, generator speed, pitch angle, power output, drivetrain torque, air density, ambient temperature, and atmospheric pressure.

7. The method of claim 6, further comprising determining the adjustment factor for the at least one first aerodynamic performance map based at least in part on the rotor speed so as to account for at least of twist or deflection of one or more rotor blades of the wind turbine.

8. The method of claim 7, wherein determining the adjustment factor for the at least one first aerodynamic performance map based at least in part on the rotor speed further comprises:
inputting the rotor speed into the processor, the processor comprising a plurality of aerodynamic performance maps corresponding to a plurality of rotor speeds;
selecting one of the plurality of aerodynamic performance maps that corresponds to the rotor speed; and,
extracting the adjustment factor from the selected aerodynamic performance map.

9. The method of claim 1, wherein controlling the wind turbine based on the adjusted aerodynamic performance map further comprises implementing a control action comprising at least one of altering the pitch angle of a rotor blade, modifying a generator torque, modifying the generator speed, modifying the power output, yawing a nacelle of the wind turbine, braking one or more wind turbine components, or activating an airflow modifying element on a rotor blade.

10. A system for controlling a wind turbine, the system comprising:
one or more sensors configured to monitor operating data indicative of current wind turbine operation; and,
a wind turbine controller comprising at least one processor, the processor communicatively coupled to the one or more sensors, the processor configured to perform one or more operations, the one or more operations comprising:
controlling the wind turbine based on at least one first aerodynamic performance map, the at least one first aerodynamic performance map comprising a dimensional or a non-dimensional table or graph that relates a loading of a rotor of the wind turbine and performance under one or more given conditions, the one or more given conditions comprising at least one of density, wind speed, rotor speed, or pitch angle;
determining an adjustment factor for the at least one first aerodynamic performance map based at least in part on the operating data;
multiplying the adjustment factor by at least one of a power coefficient or thrust coefficient obtained from the at least one first aerodynamic performance map to obtain an adjusted aerodynamic performance map; and,
controlling the wind turbine based on the adjusted aerodynamic performance map.

11. The system of claim 10, wherein the operating data comprises any one of or combination of the following: rotor speed, generator speed, pitch angle, power output, drivetrain torque, air density, ambient temperature, and atmospheric pressure.

12. The system of claim 10, wherein the one or more operations further comprise determining the adjustment factor for the at least one first aerodynamic performance map based at least in part on the rotor speed so as to account for at least one of twist or deflection of one or more rotor blades of the wind turbine.

13. The system of claim 12, wherein determining the adjustment factor for the at least one first aerodynamic performance map based at least in part on the rotor speed further comprises:
inputting the rotor speed into the processor, the processor comprising a plurality of aerodynamic performance maps corresponding to a plurality of rotor speeds;
selecting one of the plurality of aerodynamic performance maps that corresponds to the rotor speed; and,
extracting the adjustment factor from the selected aerodynamic performance map.

14. The system of claim 10, wherein determining the adjustment factor for the at least one first aerodynamic performance map further comprises utilizing one or more look-up tables, one or more equations, or a simulation model.

15. The system of claim 10, wherein the one or more operations further comprise:
monitoring an actual wind parameter of the wind turbine using one or more sensors; and,
determining the adjustment factor for the at least one first aerodynamic performance map based at least in part on the measured actual wind parameter.

16. The system of claim 15, wherein the actual wind parameter comprises at least one of a wind gust, a wind speed, a wind direction, a wind acceleration, a wind turbulence, a wind shear, a wind veer, or a wake interference.

17. The system of claim 16, wherein the one or more operations further comprise determining the adjustment factor for the at least one first aerodynamic performance map based at least in part on the wind shear so as to account for variations in wind speeds near the wind turbine.

* * * * *